US007334020B2

(12) United States Patent
Caughey

(10) Patent No.: US 7,334,020 B2
(45) Date of Patent: Feb. 19, 2008

(54) AUTOMATIC HIGHLIGHTING OF NEW ELECTRONIC MESSAGE ADDRESS

(75) Inventor: David A. Caughey, Ottawa (CA)

(73) Assignee: GoodContacts Research Ltd., Ottawa, Ontario (CA)

(*) Notice: Subject to any disclaimer, the term of this patent is extended or adjusted under 35 U.S.C. 154(b) by 453 days.

(21) Appl. No.: 10/247,496

(22) Filed: Sep. 20, 2002

(65) Prior Publication Data

US 2004/0059784 A1    Mar. 25, 2004

(51) Int. Cl.
G06F 15/16    (2006.01)
G06F 17/30    (2006.01)
(52) U.S. Cl. .................................. 709/206; 707/201
(58) Field of Classification Search .............. None
See application file for complete search history.

(56) References Cited

U.S. PATENT DOCUMENTS

| | | | |
|---|---|---|---|
| 5,740,230 | A | 4/1998 | Vaudreuil |
| 5,826,022 | A * | 10/1998 | Nielsen ............. 709/206 |
| 5,999,932 | A | 12/1999 | Paul |
| 6,023,700 | A | 2/2000 | Owens et al. |
| 6,023,723 | A * | 2/2000 | McCormick et al. ....... 709/206 |
| 6,047,327 | A | 4/2000 | Tso et al. |
| 6,049,801 | A | 4/2000 | Whitmyer, Jr. |
| 6,157,954 | A | 12/2000 | Moon et al. |
| 6,195,686 | B1 | 2/2001 | Moon et al. |
| 6,249,805 | B1 | 6/2001 | Fleming, III |
| 6,269,369 | B1 | 7/2001 | Robertson |
| 6,373,940 | B2 | 4/2002 | Shaffer et al. |
| 6,374,259 | B1 | 4/2002 | Celik |
| 6,405,243 | B1 | 6/2002 | Nielson |
| 6,424,966 | B1 | 7/2002 | Meyerzon et al. |
| 6,427,164 | B1 | 7/2002 | Reilly |
| 6,442,241 | B1 | 8/2002 | Tsumpes |
| 6,457,012 | B1 | 9/2002 | Jatkowski |
| 6,529,723 | B1 | 3/2003 | Bentley |
| 6,546,416 | B1 | 4/2003 | Kirsch |

(Continued)

FOREIGN PATENT DOCUMENTS

EP    0927945 A2    11/1999

(Continued)

OTHER PUBLICATIONS

"Method for Automatic Directory Update upon Encounter of Specific Callee Messages", IBM technical Dislosure Bulletin, vol. 37, Issue 1, p. 391-392, Jan. 1994.

(Continued)

Primary Examiner—Kenny Lin
(74) Attorney, Agent, or Firm—Freedman & Associates

(57) ABSTRACT

A method of notifying a user of an electronic communication system is disclosed. The method comprises the steps of: providing an electronic message including address data to an electronic communication process in execution within a computer system; identifying the address data within the provided electronic message; comparing address data within the provided electronic message with further address data stored on the computer within an address list; providing a notification to the user associated with the electronic message when a result of the comparison indicates that at least some of the identified address data is other than within the further address data, the notification other than a prompt to add the identified address data to the further address data.

29 Claims, 6 Drawing Sheets

U.S. PATENT DOCUMENTS

| | | |
|---|---|---|
| 6,564,264 B1 | 5/2003 | Creswell et al. |
| 6,615,241 B1 * | 9/2003 | Miller et al. ................. 709/206 |
| 6,618,716 B1 * | 9/2003 | Horvitz ........................ 706/55 |
| 6,694,353 B2 | 2/2004 | Sommerer |
| 6,791,050 B2 | 9/2004 | Daniels, Jr. et al. |
| 6,829,348 B1 | 12/2004 | Schroeder et al. |
| 6,839,737 B1 | 1/2005 | Friskel |
| 2002/0016857 A1 * | 2/2002 | Harari ........................ 709/238 |
| 2002/0049610 A1 | 4/2002 | Gropper |
| 2002/0052841 A1 * | 5/2002 | Gutherie et al. ............... 705/40 |
| 2002/0103932 A1 | 8/2002 | Bilbrey et al. |
| 2002/0107925 A1 * | 8/2002 | Goldschneider et al. .... 709/206 |
| 2002/0116463 A1 | 8/2002 | Hart |
| 2002/0136373 A1 * | 9/2002 | Togawa et al. .......... 379/93.24 |
| 2002/0169748 A1 | 11/2002 | Macholda |
| 2003/0009526 A1 | 1/2003 | Bellegardra et al. |
| 2003/0069874 A1 | 4/2003 | Hertzog et al. |
| 2003/0110224 A1 | 6/2003 | Cazier et al. |
| 2003/0158860 A1 * | 8/2003 | Caughey ....................... 707/200 |
| 2004/0015554 A1 * | 1/2004 | Wilson ........................ 709/206 |
| 2004/0039779 A1 | 2/2004 | Armstrong et al. |
| 2004/0054734 A1 | 3/2004 | Gilbert |
| 2005/0015450 A1 | 1/2005 | Keohane et al. |
| 2005/0060638 A1 | 3/2005 | Matthew et al. |

FOREIGN PATENT DOCUMENTS

| | | |
|---|---|---|
| JP | 2001344176 | 12/2001 |
| WO | WO 00/67105 A1 | 11/2000 |
| WO | WO 00/67108 A1 | 11/2000 |
| WO | WO 00/67416 A2 | 11/2000 |
| WO | WO 01/06497 A2 | 1/2001 |
| WO | WO 01/33430 A1 | 5/2001 |
| WO | WO 02/103604 A1 | 12/2002 |

OTHER PUBLICATIONS

GoodContacts.com Inc., GoodContacts: How it Works, Sep. 24, 2001, GoodContacts.com.

GoodContacts.com Inc., GoodContacts: Questions and Answers, Sep. 24, 2001, GoodContacts.com.

* cited by examiner

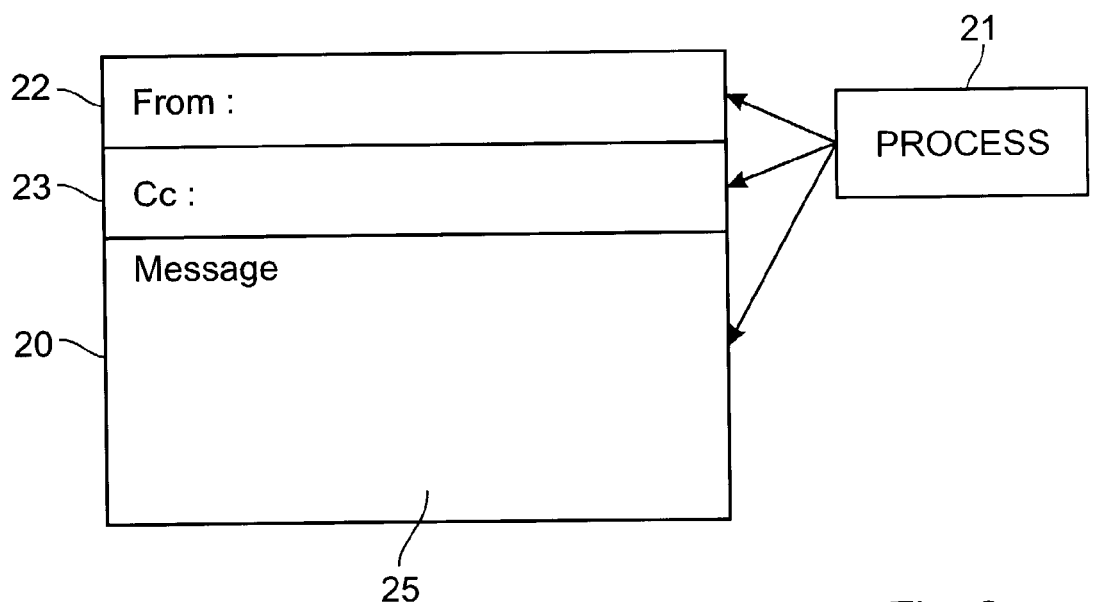

AUTOMATIC HIGHLIGHTING OF NEW ELECTRONIC MESSAGE ADDRESS

FIELD OF THE INVENTION

The present invention relates to electronic communication systems and more particularly to contact list management for use with electronic mail and messaging systems.

BACKGROUND OF THE INVENTION

In the past, people have maintained contact lists on paper. The proverbial "black book" is a good example of a list of individuals and their contact information. Unfortunately, the task of maintaining a large contact list current is often too onerous for the few times one needs to contact each individual.

A service offering automated updating of electronic contact information and ensuring most current contact information is offered by GoodContacts® through their World Wide Web site. GoodContacts® addresses the difficult task of enabling people to stay connected to their many circles of contacts. The service provided by GoodContacts® allows for updating and management of personal information relating to contacts and provides a dynamic link to all personal and professional relationships. This is performed by providing a method for each user to transmit to other users requests for information updates, thereby allowing for automatic updating of the user contacts within their address book.

Although the service that GoodContacts® provides does automate this tedious process, it only provides benefits once an individual is within a contact list. Thus, until the individual is within the contact list, the service cannot maintain contact with that person. Of course, though this seems make sense, there are times when one does not even realise that an individual is not within their contact list. For example, one may correspond with another party cc'ing a third party in all correspondence back and forth without ever realising the cc'ed individual is not within their contact list. Later, when it becomes important to contact that cc'ed individual directly, the contact information may already have been lost.

Yahoo.com provides also an opportunity to update a contact list when a reply option is chosen for sending a message to the contact person who has sent a message. Inconveniently, there is no discrimination between the addresses already saved in the address book. The service always offers the option of saving an address regardless of its existence in the address book.

Similarly, Hotmail.com offers the possibility to update the contact list of a sending party when a message is newly sent or when a message in sent in reply to an address that is not part of the existing contact list.

Inconveniently, email programs provide a method for inserting a party into an email address book only when a sending party is about to send an email message. Of course, many people merely reply to add the contact to their address book thereby causing inconvenience to both parties. Unfortunately, it is not always evident that a new contact is present within a message. For example, a committee membership may change slightly and go unnoticed by many of the individuals within the committee.

Therefore, it would be advantageous to provide a system for notifying a user that an email includes address information not existing in the address book.

OBJECT OF THE INVENTION

It is an object of this invention to provide a method for automatically notifying a party that a message contains therein data relating to an address, which is not part of the address book of the party.

SUMMARY OF THE INVENTION

In accordance with an embodiment of the present invention, there is provided a method of notifying a user of an electronic communication system comprising the steps of: providing an electronic message including address data to an electronic communication process in execution within a computer system; identifying the address data within the provided electronic message; comparing address data within the provided electronic message with further address data stored on the computer; providing a notification to the user associated with the electronic message when a result of the comparison indicates that at least some of the identified address data is other than stored within the further address data, the notification other than a prompt to add the identified address data to the further address data.

According to another embodiment of the invention there is provided a method of notifying a user of an electronic communication system comprising the steps of: receiving an electronic message including address data to an electronic communication process in execution within a first computer system, the electronic message having been received from another computer and being destined for a user of the first computer; identifying the address data within the received electronic message; comparing address data within the received electronic message with further address data stored on the computer; providing a notification to the user associated with the received electronic message when a result of the comparison indicates that at least some of the identified address data is other than within the further address data.

According to another aspect of the invention there is provided a storage medium having data stored therein, the data relating to instructions for performing the steps of: providing an electronic message including address data to an electronic communication process in execution within a computer system; identifying the address data within the provided electronic message; comparing address data within the provided electronic message with further address data stored on the computer; providing a notification to the user associated with the electronic message when a result of the comparison indicates that at least some of the identified address data is other than stored within the further address data, the notification other than a prompt to add the identified address data to the further address data.

According to another embodiment of the invention there is provided a storage medium having data stored therein, the data relating to instructions for performing the steps of: receiving an electronic message including address data to an electronic communication process in execution within a first computer system, the electronic message having been received from another computer and being destined for a user of the first computer; identifying the address data within the received electronic message; comparing address data within the received electronic message with further address data stored on the computer; providing a notification to the user associated with the received electronic message when a result of the comparison indicates that at least some of the identified address data is other than within the further address data.

According to another aspect of the invention there is provided an electronic communication system comprising: a memory for storing an address book for storing address data of a plurality of contacts of a receiving party; and, a processor for extracting address data contained within a received electronic mail message, the process for comparing the extracted address data with electronic mail message addresses with the stored addresses within the address book, and for notifying the receiving party when a result of the comparison indicates that at least one electronic mail message address contained within a received electronic mail message is not found in the address book.

BRIEF DESCRIPTION OF THE DRAWINGS

Exemplary embodiments of the invention will now be described in conjunction with the following drawings, in which:

FIG. 1 is a prior art method of updating address book upon sending an email message;

FIG. 2 shows an email messaging interface for identifying email addresses in a received email message according to the invention;

DETAILED DESCRIPTION OF THE INVENTION

Figure 3:
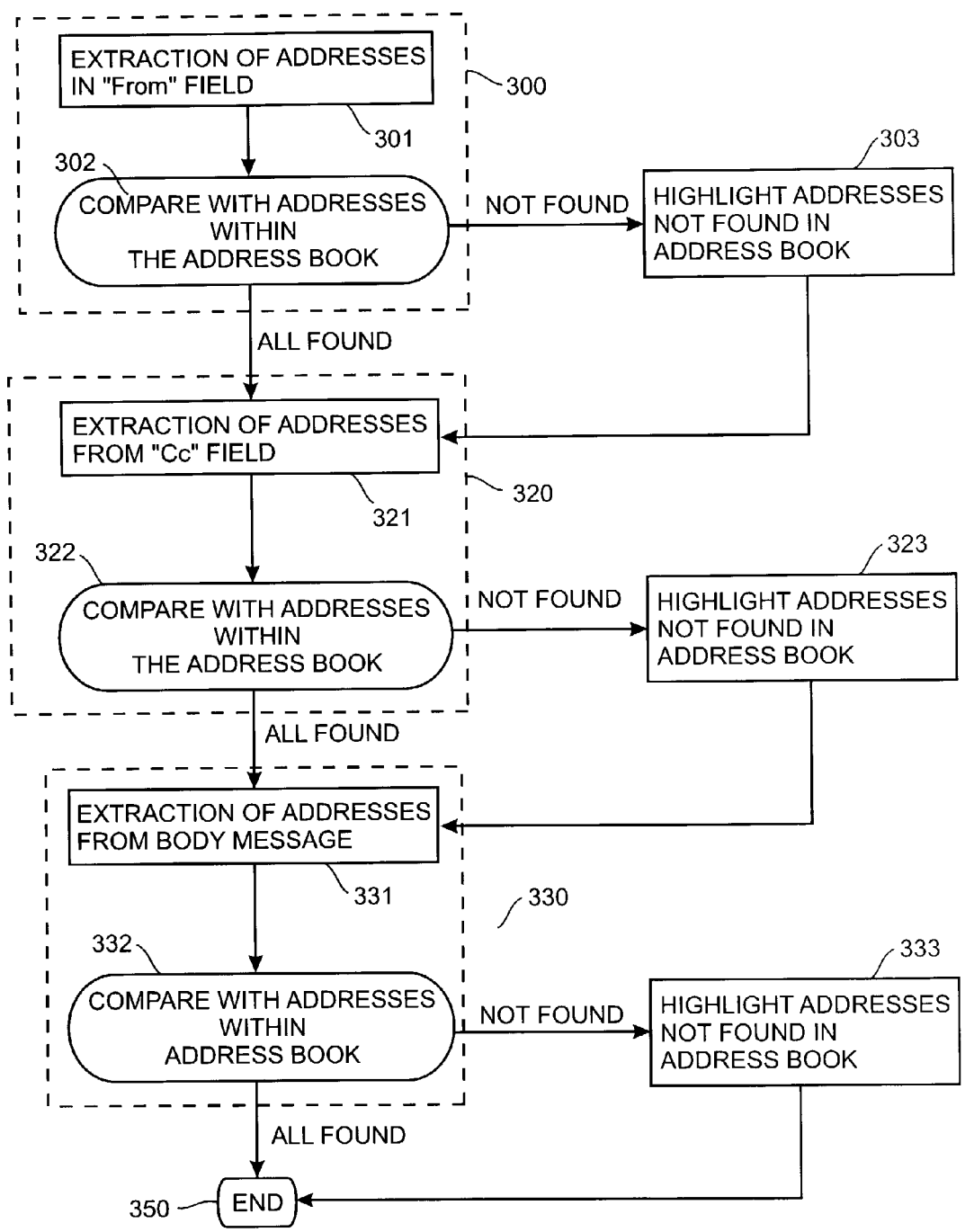
FIG. 3 shows the email-messaging process for comparing email addresses detected within a received email message with email addresses stored in an address book.

Referring to FIG. 1, a prior art method of updating address book data upon sending an email message is shown. Upon transmitting a message to a recipient address, the recipient address is compared to a plurality of addresses stored in the address book. When there is no entry within the address book for the recipient address, the sending party is notified of such, and is provided the opportunity to save the unknown contact address within the existing address book. The example of FIG. 1 indicates three email addresses that the email program has not found in the address book.

Of course, there is no obligation for the user to save the email addresses into their address book. Also, though the email address is saved at the click of a "button," the remainder of the recipient personal information must be manually entered.

Referring to FIG. 2, an email-messaging interface for identifying email addresses in received email messages according to the invention is shown. The email program of the receiving party includes a feature in the form of a process 21, which upon receipt of an email message 20 scans the different address fields of the received email message. Typically, the different address fields are in the form of a "from" field 22, and a "Cc" field 23. These different fields usually precede the message field 25 though this need not be the case. While scanning the different contact fields 22 and 23, the process identifies any contact addresses contained therein.

Discriminating between the different addresses when a plurality of addresses is contained within one field is well known in the art. It is even known, in the art of data mining to extract electronic address information from message bodies within electronic mail messages such that URL's or email addresses therein are identifiable. This is properly achieved because non-address characters as for example commas or semi-colons generally separate electronic addresses one from another. When the addresses are from different contact fields, there is no difficulty in discriminating different addresses because each field is treated as a separate entity by the process. Alternatively, the entire electronic message is treated as a single entity and discrimination between addresses therein is performed according to known methods.

Methods of address extraction are common in data mining applications and in applications for generating address lists for bulk email messaging—SPAMing.

Referring to FIG. 3 the email-messaging process for comparing email addresses detected within a received email message with email addresses stored in an address book is shown. Electronic address data is extracted from the "from" field 22 at step 301. Each of the extracted one or more addresses is compared to addresses within the address book at step 302. When all of the addresses are located within the address book, the process moves on to step 320. If an address of the extracted addresses is not found within the address book, then that address is highlighted. For example, a red flag is displayed adjacent the electronic message in a list of electronic messages. Optionally, the highlighting is only performed for the INBOX of the individual, and further optionally only for a message until it is first viewed. Of course, it is possible to permanently perform the comparison and highlighting for every message within an email database.

Electronic address data is extracted from the "cc" field 23 at step 321. Each of the extracted one or more addresses is compared to addresses within the address book at step 322. When all of the addresses are located within the address book, the process moves on to step 330. If an address of the extracted addresses is not found within the address book, then that address is highlighted. For example, a yellow flag is displayed adjacent the electronic message in a list of electronic messages to indicate that the unknown address was extracted from the "Cc" field 23. Optionally, the highlighting is only performed for the INBOX of the individual, and further optionally only for a message until it is first viewed. Of course, it is possible to permanently perform the comparison and highlighting for every message within an email database.

Electronic address data is extracted from the message field 25 at step 331. Each of the extracted one or more addresses is compared to addresses within the address book at step 332. When all of the addresses are located within the address book, the process moves on to step 350. If an address of the extracted addresses is not found within the address book, then that address is highlighted. For example, a green flag is displayed adjacent the electronic message in a list of electronic messages to indicate that the unknown address was extracted from the message field 25. Optionally, the highlighting is only performed for the INBOX of the individual, and further optionally only for a message until it is first viewed. Of course, it is possible to permanently perform the comparison and highlighting for every message within an email database.

At step 350 the process ends and normal operation of the electronic messaging system continues.

Of course, the order in which the steps are performed is not essential to the invention. Further, one or more of steps 300, 320, and 330 may be omitted. Advantageously, the flag is displayable with the message regardless of where it is stored such that when a message is moved into a mailbox such as a work mailbox, it retains the notification of an address other than present within the address list.

Figure 4:
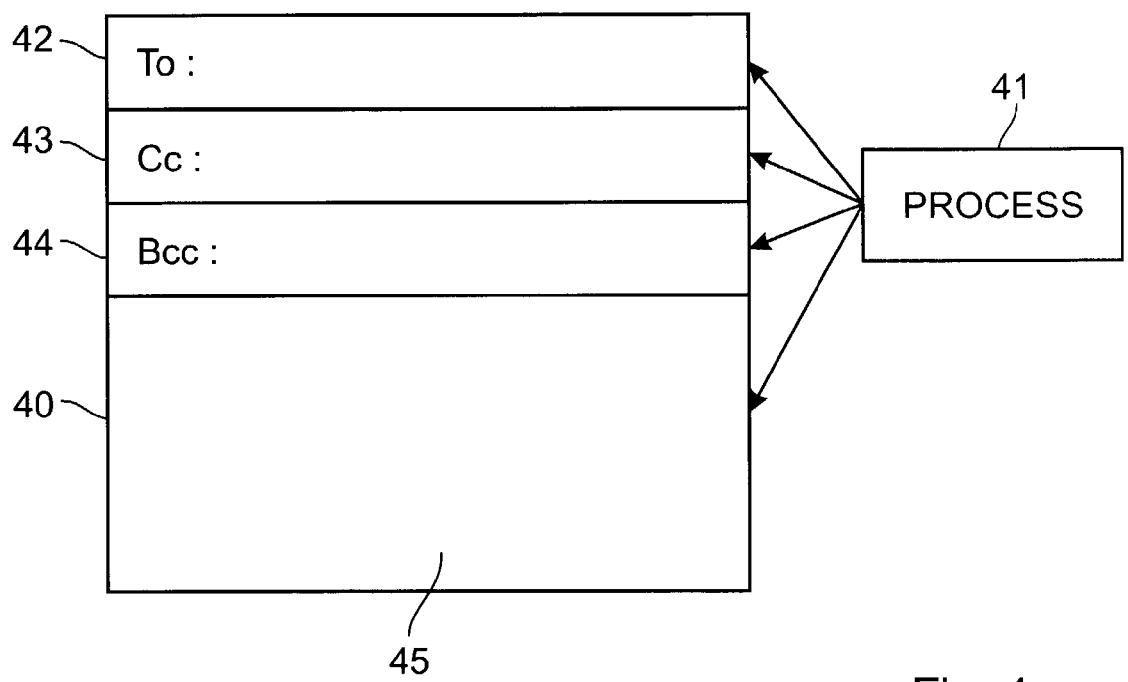
FIG. 4 shows an email messaging interface for identifying email addresses in a sent email message according to the invention.

Referring to FIG. 4, an email-messaging interface for identifying email addresses in sent email messages and messages prepared for being sent according to the invention is shown. The email program of the receiving party includes a feature in the form of a process 41, which upon receipt of an email message 40 scans the different address fields of the email message before or during sending thereof. Typically, the different address fields are in the form of a "to" field 42, a "Cc" field 43, and a "Bcc" field 44. These different fields usually precede the message field 45 though this need not be the case. While scanning the different contact fields 42, 43 and 44, the process identifies any contact addresses contained therein.

Discriminating between the different addresses when a plurality of addresses is contained within one field is well known in the art. It is even known, in the art of data mining to extract electronic address information from message bodies within electronic mail messages such that URL's or email addresses therein are identifiable. This is properly achieved because in header fields non-address characters as for example commas or semi-colons generally separate electronic addresses one from another; in message fields, address formats are identifiable as characters of the form xxx@xxx.com or another known Top Level Domain (TLD) extension. When the addresses are from different contact fields, there is no difficulty in discriminating different addresses because each field is treated as a separate entity by the process. Alternatively, the entire electronic message is treated as a single entity and discrimination between addresses therein is performed according to known methods.

Methods of address extraction are common in data mining applications and in applications for generating address lists for bulk email messaging—SPAMing.

Figure 5:
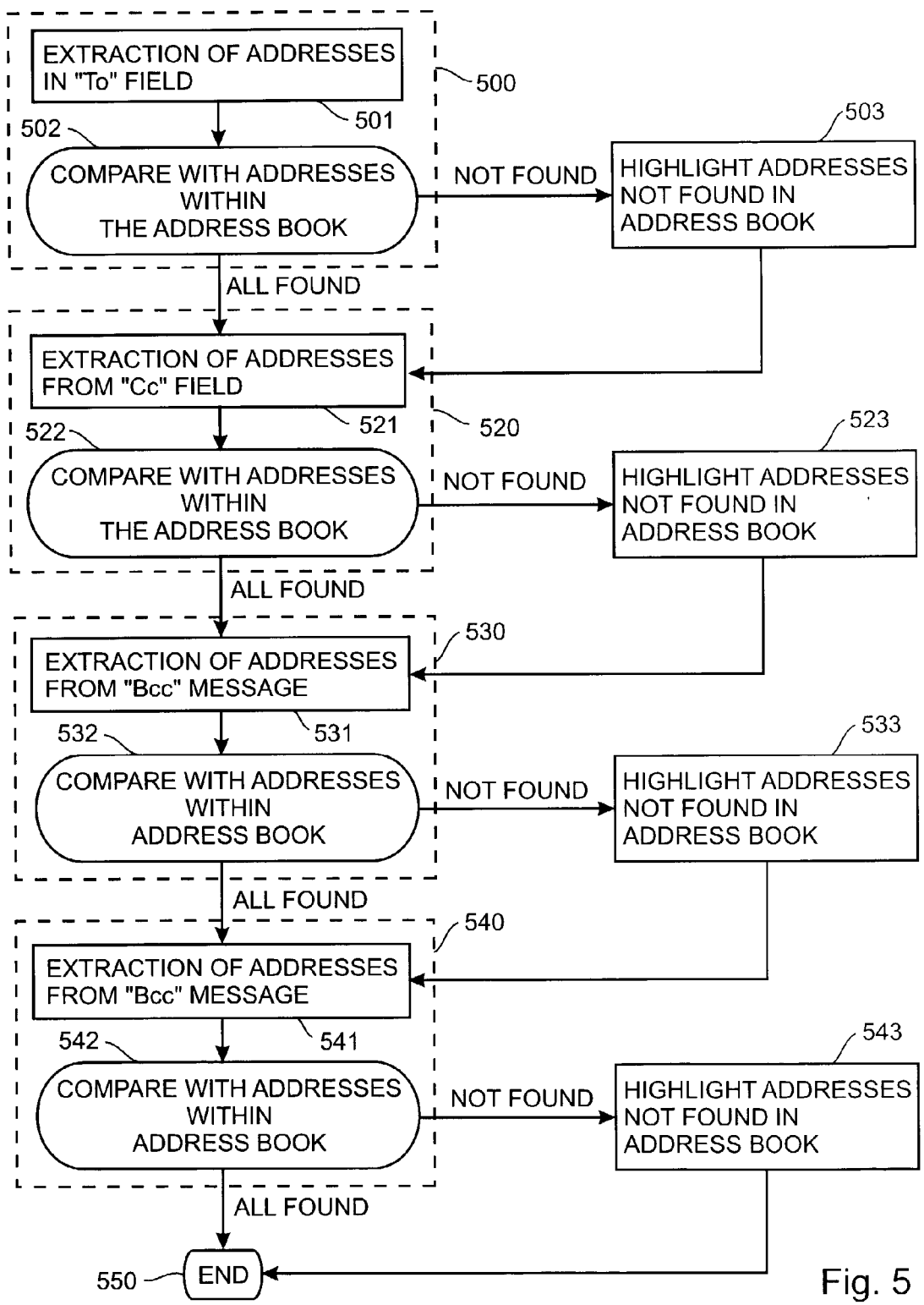
FIG. 5 shows the email-messaging process for comparing email addresses detected within a sent email message with email addresses stored in an address book.

Referring to FIG. 5 the email-messaging process for comparing email addresses detected within an email message that is to be sent or in a process of being sent with email addresses stored in an address book is shown. Electronic address data is extracted from the "to" field 42 at step 501. Each of the extracted one or more addresses is compared to addresses within the address book at step 502. When all of the addresses are located within the address book, the process moves on to step 520. If an address of the extracted addresses is not found within the address book, then that address is highlighted. For example, a red flag is displayed adjacent the electronic message in a list of electronic messages. Optionally, the highlighting is only performed for the INBOX of the individual, and further optionally only for a message until it is first viewed. Of course, it is possible to permanently perform the comparison and highlighting for every message within an email database.

Electronic address data is extracted from the "cc" field 43 at step 521. Each of the extracted one or more addresses is compared to addresses within the address book at step 522. When all of the addresses are located within the address book, the process moves on to step 530. If an address of the extracted addresses is not found within the address book, then that address is highlighted. For example, a yellow flag is displayed adjacent the electronic message in a list of electronic messages to indicate that the unknown address was extracted from the "Cc" field 43. Optionally, the highlighting is only performed for the INBOX of the individual and further optionally only for a message until it is first viewed. Of course, it is possible to permanently perform the comparison and highlighting for every message within an email database.

Electronic address data is extracted from the "Bcc" field 44 at step 531. Each of the extracted one or more addresses is compared to addresses within the address book at step 532. When all of the addresses are located within the address book, the process moves on to step 540. If an address of the extracted addresses is not found within the address book, then that address is highlighted. For example, a yellow flag is displayed adjacent the electronic message in a list of electronic messages to indicate that the unknown address was extracted from the "Bcc" field 44. Optionally, the highlighting is only performed for the INBOX of the individual and further optionally only for a message until it is first viewed. Of course, it is possible to permanently perform the comparison and highlighting for every message within an email database.

Electronic address data is extracted from the message field 45 at step 541. Each of the extracted one or more addresses is compared to addresses within the address book at step 542. When all of the addresses are located within the address book, the process moves on to step 550. If an address of the extracted addresses is not found within the address book, then that address is highlighted. For example, a green flag is displayed adjacent the electronic message in a list of electronic messages to indicate that the unknown address was extracted from the message field 45. Optionally, the highlighting is only performed for the INBOX of the individual, and further optionally only for a message until it is first viewed. Of course, it is possible to permanently perform the comparison and highlighting for every message within an email database.

At step 550 the process ends and normal operation of the electronic messaging system continues.

Of course, the order in which the steps are performed is not essential to the invention. Further, one or more of steps 500, 520, 530 and 540 may be omitted. Advantageously, the flag is displayable with the message regardless of where it is stored such that when a message is moved into a mailbox such as Joe's mailbox, it retains the notification of an address other than present within the address list.

Figure 6:
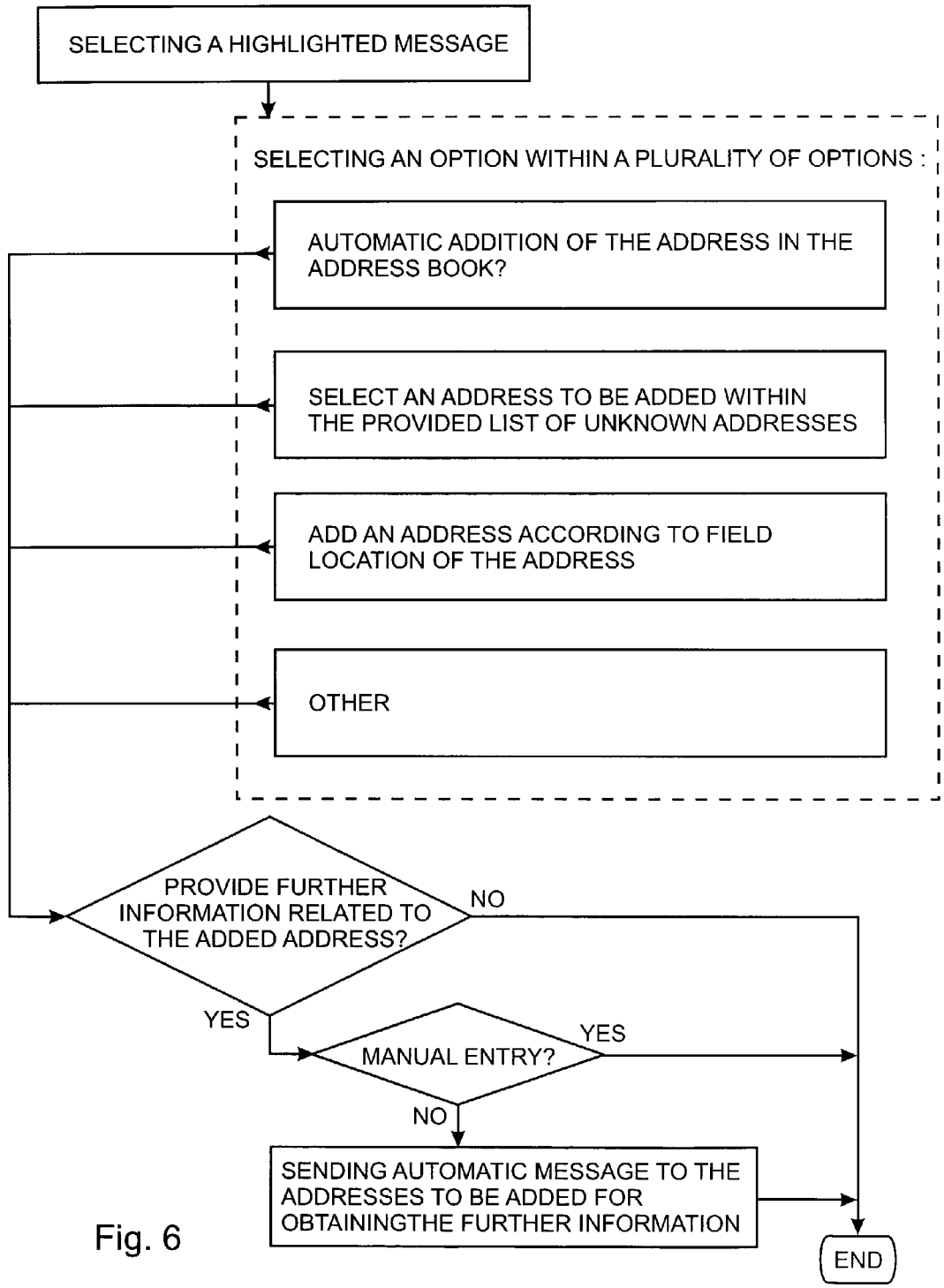
FIG. 6 shows a flow chart diagram of a method of automatically adding an address to the address book; and, FIG. 7 shows the email-messaging process for comparing address data to stored address data.

Referring to FIG. 6, a method of automatically adding an address to the address book is shown. Here, when a user selects an active option for a message—for example in Windows® operating systems by clicking on the right mouse button while pointing to an email message, an option is displayed to allow automatic addition of the individual to the address book. Optionally, the user is provided with a list of unknown addresses to select, which from the list is to be added. Alternatively, all unknown addresses are added. Optionally, the user is prompted to provide additional information relating to each address to be added. Alternatively, a message is sent to each new contact requesting information for inclusion within the contact list. Alternatively, there is an option provided to add all unknown addresses to the address book or to add them based on the field in which they are located.

Figure 7:
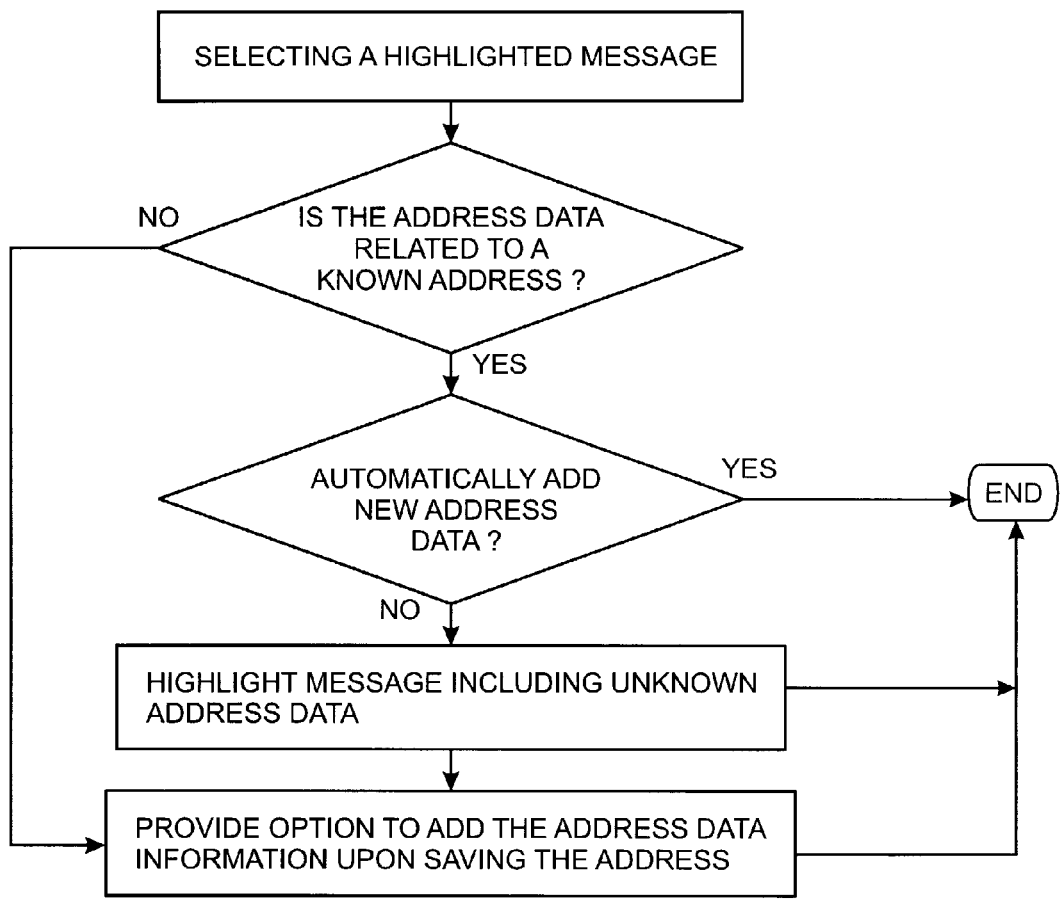

Referring to FIG. 7, an embodiment of the invention is shown wherein address data is compared to stored address data to determine different or missing portions. As such, upon receipt of a message, it is scanned for extracting address data located at the end of the message with the signature for example. The address data correspond to contact information related to the sending part as for example, phone and fax number, at home and or at work and so forth. When the address data or a portion of the address data is new, the message is highlighted with a further colour, blue for example. When the address data or a portion of the address data are new and originating from a known electronic address already stored within the address book of the receiving party, the receiving party is prompted to associate the new information with the known address. Optionally, the addition of the new information is automatically performed absent a notification to the receiving party. Alternatively, when the address data are coming from an unknown address, the address data are provided to the user if the user decides to add the new address in the address book and select an option of adding additional information related to the new added address.

Of course, the selection of colours indicated in the above embodiments is arbitrary for exemplary purposes. Of course, though coloured flags are disclosed in the above noted embodiment, the highlighting of messages could be performed in any of a number of ways. For example, a sound is played when the message is selected indicative of unknown addresses or more specifically of which fields include unknown address data. Alternatively, all detected unknown addresses are individually highlighted in colour or in text format—i.e. bold, underline, blinking, inverse, or italics. Of course, those of skill in the art know many methods of highlighting messages or text, and messages and text according to the invention may be highlighted in any suitable fashion including those, which may come to light after the filing of this application.

Numerous other embodiments may be envisaged without departing from the spirit or scope of the invention.

What is claimed is:

1. A method of notifying a user of an electronic communication system comprising the steps of:
   receiving an electronic message addressed to the user from a sender comprising a message body and at least one of a plurality of fields to an electronic communication process in execution within a computer system, the message body comprising at least signature address data;
   identifying occurrences of first electronic address data within the received electronic message, said first electronic address data representing an identity of an enterprise associated with the sender within at least the signature address data;
   associating with the first electronic address data a sender top level domain, the sender top level domain being a predetermined portion of the electronic address of the sender contained within the received electronic message;
   identifying occurrences of second electronic address data within the received electronic message, said second electronic address data representing an electronic address formatted according to a protocol for directing the electronic message, the second electronic address data comprising at least the sender top level domain;
   identifying occurrences of third electronic address data within the received electronic message, said third address data representing an electronic address formatted according to the protocol for directing the electronic message, the third electronic address data comprising at least a top level domain other than a top level domain of the user and the sender top level domain;
   automatically comparing the second and the third electronic address data with fourth electronic address data stored on the computer; and
   providing a notification to the user, the notification provided upon determining the presence of at least one of the second and the third electronic address data, the notification other than a prompt to add the identified second and the third electronic address data to the fourth electronic address data.

2. A method according to claim 1 wherein at least one of the electronic address of the sender contained within the received electronic message and the fourth electronic address data comprise data relating to an electronic address for directing of the received electronic message.

3. A method according to claim 2 wherein the fourth electronic address data—consists of data stored within at least one of an electronic address book associated, with an electronic mail application and an electronic contact database not owned by the user, the data relating to an electronic address for directing of the electronic message.

4. A method according to claim 1 wherein the provided electronic message further comprises an electronic business card.

5. A method according to claim 1 wherein the provided electronic message is parsed to detect the first electronic address data relating to the enterprise identity from within the message body of the provided electronic message, said message body including "Sender", "To", "From", "Bcc", "Subject", and "Cc" fields of an original electronic message included within the provided electronic message.

6. A method according to claim 1 further comprising:
   selecting the received provided electronic message;
   initiating at least one of a reply to the received electronic message and a forward of the received electronic message; and
   including, automatically, at least some of the identified second electronic address data, and in dependence upon at least a user input, at least some of the third electronic address data.

7. A method according to claim 1 wherein,
   identifying occurrences of the second and the third electronic address data further comprises associating contact data with each of the second and the third electronic address data, the associated contact data for being stored in conjunction with the second and the third electronic address data.

8. A method according to claim 1 wherein the step of providing notification includes a step of providing at least one of a first visual indication associated with the second electronic address data, a second visual indication associated with the third electronic address data, and a third visual indication of at least one of the sender top level domain and enterprise identity, the visual indication provided when the received electronic message is displayed to the user.

9. A method according to claim 8 wherein providing the visual indication when the received electronic message is displayed comprises providing the visual indication when the received electronic message is a least one of opened, forwarded and replied to.

10. A method according to claim 1 wherein the step of providing notification includes a step of providing and an audible indication associated with the provided electronic message.

11. A method according to claim 10 wherein the notification includes an audibly distinguishable indication of the presence of the second electronic address data, the presence of the third electronic address data and the presence of both the second and the third electronic address data.

12. A method according to claim 1 comprising the steps of:
   selecting the received electronic message;
   initiating an update of the fourth electronic address data; and
   adding, automatically, at least some of the identified second and the third electronic address data, other than a sender address data, from the received electronic message to the fourth electronic address data stored on the computer.

13. A method according to claim 12 including the steps, performed prior to the step of adding automatically, of prompting the user with a list of electronic addresses relating to identified second and the third electronic address data and selecting from the list electronic addresses for which the second and the third electronic data is to be at least one of stored and used to modify the fourth electronic address data.

14. A method according to claim 12 including the step of automatically transmitting to each electronic address relating to the identified first, the second and the third electronic address data a request to at least one of verify and update address data relating to the identified second and the third electronic address data.

15. A method of notifying a user of an electronic communication system comprising the steps of:
   receiving an electronic message comprising at a message body and at least one of a plurality of fields with an electronic communication process in execution within a first computer system, the electronic message having been received from another computer and being destined for a user of the first computer, the message body comprising at least signature address data;
   identifying occurrences of the first electronic address data within the received electronic message, said first electronic address data representing an identity of an enterprise associated with the sender within at least the signature address data;
   associating with the first electronic address data a sender top level domain, the sender top level domain being a predetermined portion of the electronic address of the sender contained within the received electronic message;
   comparing at least one of the first electronic address data and the sender top level domain within the received electronic message with second electronic address data stored on the computer; and
   providing a notification to the user associated with the received electronic message when a result of the comparison indicates that at least one of the sender top level domain and at least some of the first electronic address data is other than within the second electronic address data.

16. A method according to claim 15 wherein the second electronic address data comprises electronic data relating to an electronic address for directing of the received electronic message.

17. A method according to claim 16 wherein the second electronic address data consists of electronic data relating to at least one of a name of an enterprise and a name of a top level domain and an electronic address for automatically directing of the received electronic message.

18. A method according to claim 15 wherein the received electronic message is parsed to detect first electronic address data relating to the enterprise identity from within the message body of the received electronic message, said message body including "Sender", "To", "From", "Bcc", "Subject", and "Cc" fields of an original electronic message included within the electronic message.

19. A method according to claim 15 wherein the received electronic message is parsed to detect first electronic address data relating to the enterprise identity from within the message body, the message body being a message field of the received electronic message.

20. A method according to claim 15 wherein identifying occurrences of the first electronic address data further comprises contact data for being stored in conjunction with the second electronic address dam and wherein the step of identifying the first electronic address data includes the step of parsing the received electronic message to detect the contact data from within a message field of the received electronic message.

21. A method according to claim 15 wherein the step of providing notification includes a step of providing a visual indication associated with at least one of the presence of the first electronic address data and indicative of the location of the first electronic address data within the received electronic message, the visual indication provided when the received electronic message is at least one of displayed and listed within a list of received electronic messages.

22. A method according to claim 21 wherein the visual indication includes a visually distinguishable indication of a field within the electronic message wherein the first electronic address data is identified.

23. A method according to claim 15 wherein the step of providing notification includes a step of providing an audible indication associated with the received electronic message.

24. A method according to claim 23 wherein the notification includes an audibly distinguishable indication of a field within the electronic message wherein the first electronic address data is identified.

25. A method according to claim 15 comprising the steps of:
   selecting the received electronic message;
   initiating an update of the second electronic address data; and adding, automatically, at least some of the identified first electronic address data, the first electronic address data being other than the sender address data, from the selected electronic message to the second electronic address data when the result of the comparison indicates that at least one of the sender top level domain and at least some of the identified first electronic address data is within the second electronic address data.

26. A method according to claim 25 including the steps, performed prior to the step of adding automatically, of prompting the user with a list of electronic addresses relating to at least one of the identified first electronic address data and the sender top level domain and selecting from the list electronic addresses for which the second electronic data is to be at least one of stored and modified.

27. A method according to claim 25 including the stop of automatically transmitting to each first electronic address relating to the at least one of the identified first electronic address data and the sender top level domain a request to at least one of verify and update address data relating to the identified first electronic address data.

28. A computer readable medium having stored therein data according to a predetermined computing device format, and upon execution of the data by a suitable computing device a method for extracting electronic address data within an electronic message is provided, comprising:

receiving an electronic message addressed to the user from a sender comprising a message body and at least one of a plurality of fields to an electronic communication process in execution within a computer system, the message body comprising at least signature address data;

identifying occurrences of first electronic address data within the received electronic message, said first electronic address data representing an identity of an enterprise associated with the sender within at least the signature address data;

associating with the first electronic address data a sender top level domain, the sender top level domain being a predetermined portion of the electronic address of the sender contained within the received electronic message;

identifying occurrences of second electronic address data within the received electronic message, said second electronic address data representing an electronic address formatted according to a protocol for directing the electronic message, the second electronic address data comprising at least the sender top level domain;

identifying occurrences of third electronic address data within the received electronic message, said third address data representing an electronic address formatted according to the protocol for directing the electronic message, the third electronic address data comprising at least a top level domain other than a top level domain of the user and the sender top level domain;

automatically comparing the second and the third electronic address data with fourth electronic address data stored on the computer; and resulting in providing a notification to the user, the notification provided upon determining the presence of at least one of the second and the third electronic address data, the notification other than a prompt to add the identified second and the third electronic address data to the fourth electronic address data.

29. A computer readable medium having stored therein data according to a predetermined computing device format, and upon execution of the data by a suitable computing device a method for extracting electronic address data within an electronic message is provided, comprising:

receiving an electronic message comprising at a message body and at least one of a plurality of fields with an electronic communication process in execution within a first computer system, the electronic message having been received from another computer and being destined for a user of the first computer, the message body comprising at least signature address data;

identifying occurrences of first electronic address data within the received electronic message, said first electronic address data representing an identity of an enterprise associated with the sender within at least the signature address data;

associating with the first electronic address data a sender top level domain, the sender top level domain being a predetermined portion of the electronic address of the sender contained within the received electronic message;

comparing at least one of the first electronic address data and the sender top level domain within the received electronic message with second electronic address data stored on the computer; and resulting in providing a notification to the user associated with the received electronic message when a result of the comparison indicates that at least one of the sender top level domain and at least some of the identified first electronic address data is other than within the second electronic address data.

* * * * *